April 22, 1969     J. W. SHAFFER ET AL     3,439,992

PHOTOFLASH LAMP

Filed Nov. 24, 1967

JOHN W. SHAFFER
DONALD W. HARTMAN
INVENTORS

BY Joseph C. Ryan
ATTORNEY 3,439,992
PHOTOFLASH LAMP
John W. Shaffer, Montoursville, and Donald W. Hartman, Williamsport, Pa., assignors to Sylvania Electric Products, Inc., a corporation of Delaware
Filed Nov. 24, 1967, Ser. No. 685,623
Int. Cl. F21k 5/02
U.S. Cl. 431—93                    2 Claims

ABSTRACT OF THE DISCLOSURE

A percussive-type photoflash lamp in which the primer thereof includes a baffle arranged to protect the shredded foil within the lamp envelope from the detrimental effects of the high velocity gas flow resulting from firing of the primer.

---

Figure 1:
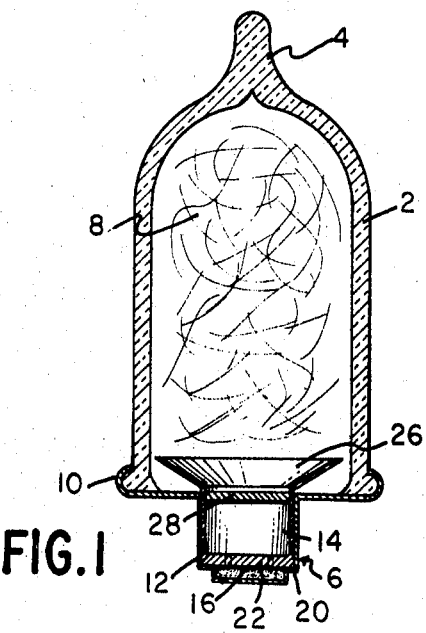

This invention relates to the manufacture of photoflash lamps and more particularly those of the percussive type.

Generally speaking, a percussive-type photoflash lamp comprises an hermetically sealed, light-transmitting envelope containing a source of actinic light and having a primer secured thereto. More particularly, the percussive-type photoflash lamp comprises a length of glass tubing constricted to a tip at one end thereof and having the shell portion of a primer secured to the other end thereof. The length of glass tubing which defines the lamp envelope contains a combustible such as shredded zirconium foil and a combustion-supporting gas such as oxygen. The primer comprises a metal shell within which an anvil and a charge of fulminating material are disposed.

Operation of a percussive-type photoflash lamp is initiated by a firing pin which is caused to strike the bottom of the primer cup or shell to promote ignition of the charge of fulminating material disposed therein. Deflagration of the charge ignites the shredded foil, the combustion of which is the source of the actinic light.

Because of its very rapid burning characteristics, deflagration of the charge causes a very high velocity flow of flame and hot gases up the axis of the flashlamp. This gas flow, in turn, impinges on the shredded combustible and frequently compresses the shreds into a tightly compacted ball in the upper end of the lamp envelope. Such shred compaction is very undesirable for several reasons: combustion is inefficient and the full light output is not realized; misorientation of the burning shreds with respect to the lamp's reflector further reduces the photographically usable light output; confinement of combustion in the dome area of the lamp envelope imparts a large thermal shock to the envelope and leads to uncertain lamp containment; and the combustion of compacted shreds promotes formation of unduly large metallic globules which may drop to the bottom of the lamp and melt through the metal shell or base of the primer with attendant damage to the camera and danger for the user.

In view of the foregoing, one of the principal objects of this invention is to protect the shredded combustible within a flashlamp of the percussive-type from the detrimental effects of the high velocity gas flow resulting from deflagration of the charge of fulminating material.

Another object is to provide a percussive-type flashlamp having more uniform light output characteristics.

A further object is to provide a percussive-type flashlamp having improved lamp containment and safety characteristics.

Further objects, advantages and features are attained, in accordance with the principles of this invention, by providing a percussive-type photoflash lamp with a primer having an anvil, the working face of which is flat and which is provided with a plurality of apertures therein, and a baffle disposed between the working face of the anvil and the filamentary combustible material with which the lamp envelope is provided.

In the specific embodiment of the invention illustrated in the accompanying drawings, FIGURE 1 is an elevational view in section of a photoflash lamp embodying the principles of this invention.

Figure 2:
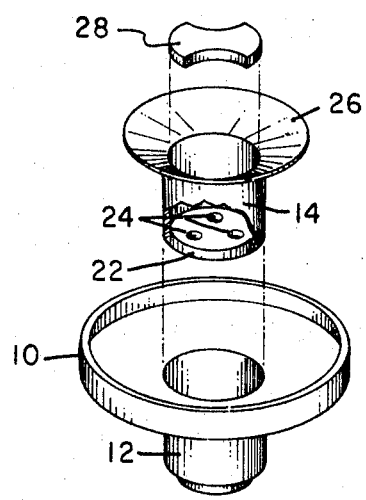

FIGURE 2 is an exploded view of the primer employed with the lamp of FIGURE 1.

Referring now to the drawings, particularly FIGURE 1 thereof, the flashlamp illustrated therein comprises a lamp envelope 2 havin gan exhaust tip 4 defining one end thereof and having a primer 6 sealed to the other end thereof. A combustible such as filamentary zirconium 8 and a combustion-supporting gas such as oxygen are disposed within the lamp envelope. 2. The primer 6 comprises a metal shell or base 10 having a central depending cup portion 12 within which anvil 14 and a charge 16 of fulminating material are disposed. The bottom of the cup 12 is coined to define an accurately dimensioned reservoir within which the charge of fulminating material is disposed and to provide an internal rim 20 on which the anvil 14 is seated.

Referring now more particularly to FIGURE 2, the anvil 14 is a cup-shaped insert having a flat bottom 22 with holes 24 therein, an upper flange 26 and a baffle 28. The anvil 14 fits into the cup portion 12 of the base 10 with the flat bottom 22 of the anvil seated on the internal rim 20 of the base 10. Combustion products of the charge of fulminating material 16 rise through the holes 24 in the flat bottom of the anvil 14 and ignite the shredded foil 8 to thereby "flash" the lamp. The cup-shaped configuration of the specific embodiment of anvil 14 in combination with the upper flange 26 thereof serves to protect the relatively thin base 10 from unduly large metallic globules which may form during combustion of the shredded foil and drop to the bottom of the lamp.

The baffle 28 which lies between the flat working face 22 of the anvil 14 and the filamentary zirconium 8 breaks up the high velocity flow of flame and hot gases up the axis of the flashlamp due to deflagration of the charge 16 and effectively prevents shred compaction without reducing the reliability of shred ignition. Although a baffle of the particular shape illustrated in the drawing has proven to be quite effective, other shapes may also be employed without departing from the spirit of the invention provided they break up the high velocity gas flow resulting from deflagration of the charge without reducing the reliability of shred ignition.

What we claim is:
1. A photoflash lamp comprising:
   an hermetically sealed, light-transmitting envelope;
   a quantity of filamentary combustible material located within said envelope;
   a combustion-supporting gas in said envelope;
   a primer secured to and closing one end of said envelope said primer comprising a base having a central depending cup portion, a charge of fulminating material disposed in the bottom of said depending cup portion and an anvil disposed in said depending cup portion, said anvil having a flat-faced portion overlying and in close proximity to said charge of fulminating material;

and a baffle disposed between said flat-faced portion of said anvil and said quantity of filamentary combustible material.

2. The combination of claim 1 in which the flat-faced portion of the anvil is provided with a plurality of apertures therein.

References Cited

FOREIGN PATENTS

| 14,821 | 4/1934 | Australia. |
| 431,953 | 7/1935 | Great Britain. |

CHARLES J. MYHRE, *Primary Examiner.*